United States Patent
Mizutani et al.

(10) Patent No.: US 7,609,834 B2
(45) Date of Patent: Oct. 27, 2009

(54) PERSONAL AUTHENTICATING MULTI-FUNCTION PERIPHERAL

(75) Inventors: Akihiro Mizutani, Tokyo (JP);
Kazuhiro Ogura, Kanagawa-ken (JP);
Shinji Makishima, Tokyo (JP);
Toshihiro Ida, Tokyo (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 836 days.

(21) Appl. No.: 11/194,707

(22) Filed: Aug. 2, 2005

(65) Prior Publication Data
US 2007/0030961 A1 Feb. 8, 2007

(51) Int. Cl.
*H04K 1/00* (2006.01)
*H04L 9/00* (2006.01)
*H04L 9/30* (2006.01)

(52) U.S. Cl. .......................... 380/30; 713/156
(58) Field of Classification Search ............ 380/51, 380/30; 713/156, 168
See application file for complete search history.

(56) References Cited

U.S. PATENT DOCUMENTS

2004/0008842 A1* 1/2004 Partelow et al. ............... 380/51
2005/0097323 A1* 5/2005 Lapstun et al. ............... 713/168
2005/0152543 A1* 7/2005 Shima et al. .................. 380/51
2006/0064580 A1* 3/2006 Euchner et al. ............. 713/156

FOREIGN PATENT DOCUMENTS

JP 2004-086894 A 3/2004
WO WO 2004/013749 A1 2/2004

OTHER PUBLICATIONS

Jim Dawson; Turbo Cryptographic Card (TCC) security policy; Dec. 14, 1998; csrc.nist.gov; SP-14094-0; p. 1-14.*

* cited by examiner

*Primary Examiner*—Kambiz Zand
*Assistant Examiner*—Monjour Rahim
(74) *Attorney, Agent, or Firm*—Foley & Lardner LLP

(57) ABSTRACT

A method and apparatus of printing a document in a secure manner, includes receiving, by a printer, print data that has been encrypted using a printer public key. The printer-public-key-encrypted print data is decrypted by the printer using a printer secret key, to obtain decrypted print data as well as user identification information provided with the print data. Print pre-processing is performed by the printer on the decrypted print data, to thereby obtain pre-processed print data. The pre-processed print data is encrypted by the printer using a user secret key to obtain user-public-key-encrypted print data, and the user-public-key-encrypted print data is stored. The user-public-key-encrypted print data is decrypted and printed by the printer upon receipt of a user secret key, prior to printing the print data.

23 Claims, 2 Drawing Sheets

PERSONAL AUTHENTICATING MULTI-FUNCTION PERIPHERAL

FIELD OF THE INVENTION

The present invention relates generally to a multi-function peripheral (MFP) and a method for personal authenticating information to be printed by the MFP.

BACKGROUND OF THE INVENTION

Office security is an important aspect in today's workplace, and applies to all aspects of the workplace, including the printing of documents. In a conventional copier or MFP or image forming apparatus (hereinafter, for ease, collectively referred to as "MFP"), when a user wants to print a document or an image, the user sends, by way of a personal computer (PC), a postscript file (e.g., PDL) to the MFP. The MFP receives the postscript file from the PC, and waits for authentication from the user before performing further processing on the postscript file. The authentication is typically provided by the user inputting a user identification (user ID) and password at the MFP. Once the MFP receives the authentication from the user and authenticates the user, the MFP the decodes the postscript file, performs raster image processing (RIP) on the decoded data, and then prints the document.

A problem with the above-mentioned process is that it takes some time for the MFP to perform the needed decoding and RIP operations on the user's document, after having received and performed the authentication of the user, thereby making the user wait for the document to be decoded, processed and then printed.

Accordingly, there exists a desire to speed up the processing of a document to be printed using secure techniques.

SUMMARY OF THE INVENTION

According to an aspect of the invention, a method of printing a document in a secure manner, includes receiving, by a printer, print data that has been encrypted using a printer public key. The printer-public-key-encrypted print data is decrypted by the printer using a printer secret key, to obtain decrypted print data as well as user identification information provided with the print data. Print pre-processing is performed by the printer on the decrypted print data, to thereby obtain pre-processed print data. The pre-processed print data is encrypted by the printer using a user secret key to obtain user-public-key-encrypted print data, and the user-public-key-encrypted print data is stored. The user-public-key-encrypted print data is decrypted and printed by the printer upon receipt of a user secret key, prior to printing the print data.

According to another aspect of the invention, there is provided a printer, which includes an input unit configured to receive print data that has been encrypted using a printer public key. The printer also includes a decrypting unit configured to decrypt the printer-public-key-encrypted print data using a printer secret key, to obtain decrypted print data and to obtain user identification information provided with the print data. The printer further includes a print pre-processing unit configured to perform pre-processing on the decrypted print data received from the decrypting unit, to thereby obtain pre-processed print data. The printer still further includes an encrypting unit configured to encrypt the pre-processed print data received from the print pre-processing unit using a user public key to obtain user-public-key-encrypted print data, and to store the user-public-key-encrypted print data. The user-public-key-encrypted print data is decrypted and printed by the printer upon receipt of a user secret key, prior to printing the print data.

According to yet another aspect of the invention, there is provided a method of printing a document in a secure manner, which includes receiving, by a printer, print data that has been encrypted using a printer public key. The method also includes decrypting the printer-public-key-encrypted print data using a printer secret key, to obtain decrypted print data. The method further includes obtaining user identification information that has been provided in the print data. The method still further includes performing print pre processing on the decrypted print data, to thereby obtain pre-processed print data. The method also includes storing the pre-processed print data in a memory accessible by the printer. The method further includes receiving, by the printer, a user input corresponding to identification information. The method still further includes comparing the user input to the user identification information that has been obtained in the obtaining step. If the comparing step indicates that the user identification obtained in the obtaining step is the same as the user input corresponding to identification information, the pre-processed print data is printed by the printer.

Further features, aspects and advantages of the present invention will become apparent from the detailed description of preferred embodiments that follows, when considered together with the accompanying figures.

DETAILED DESCRIPTION

An aspect of the present invention provides for a personal authenticating MFP that provides high security and that prints documents in a relatively speedy manner once the user authentication has been received by the MFP. To achieve this, a public key/private key cryptosystem is utilized for both the MFP and the user, which shortens the waiting time for printing a high security document by an MFP.

Figure 1:
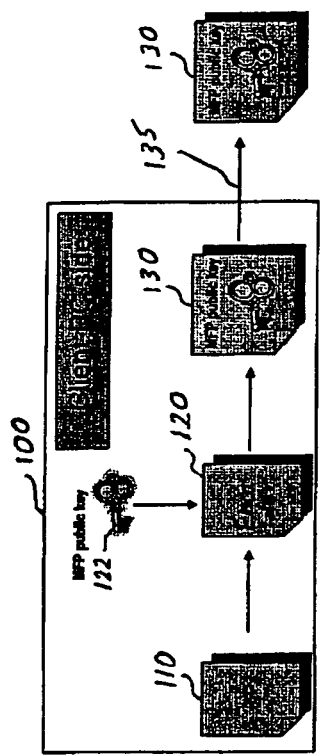
FIG. 1 is a block diagram of components provided in a user's PC to provide for secure printing, in accordance with a first embodiment of the invention.

FIG. 1 is a block diagram showing components at a User's PC 100, in accordance with a first embodiment of the invention. A user outputs a command to print data in a secure manner by an MFP. The print data is converted to a postscript file 110, and is initially coded by an encoder 120, whereby the encoding (also referred to herein as "encryption") is performed by using an MFP public key 122. The MFP public key 122 is readily available to the User's PC 100, such as from an external network (e.g., Internet), or it can be previously stored in a memory or hard disk drive (HDD) of the User's PC 100. Once the postscript file 110 has been encoded using the MFP public key 122, thereby obtaining MFP-public key-encoded data 130, that encrypted data is sent from the User's PC 100 to an MFP, such as by a company local area network (LAN) 135 or any other data communications medium. The encrypted data 130 also includes user data, whereby the user data includes the user ID and the ID of the User's PC 100, and optionally also includes other user information.

Figure 2:
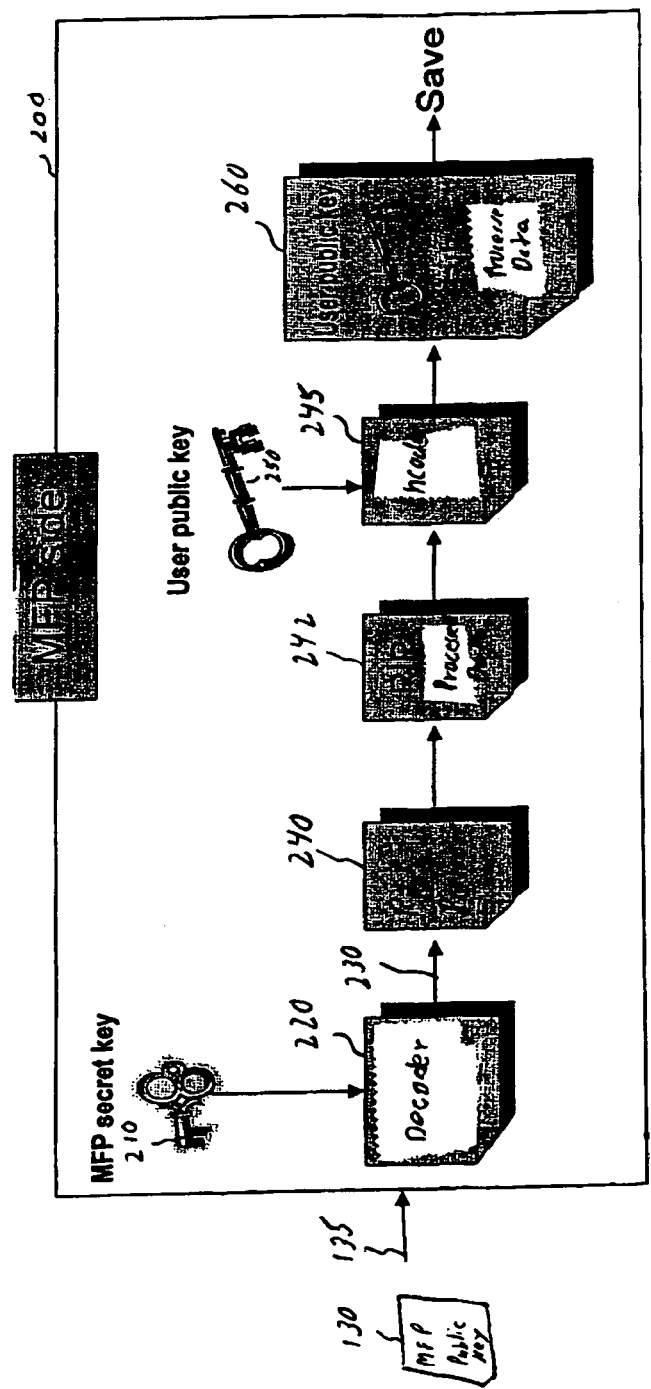
FIG. 2 is a block diagram of components provided in an MFP to process and eventually save an encrypted print file, in accordance with the first embodiment of the invention.

FIG. 2 is a block diagram showing components of an MFP 200 utilized to create and save an encrypted document, in accordance with the first embodiment of the invention. The MFP 200 receives the public-key encoded data 130 over the network as sent from the User's PC 100, and decodes that MFP-public-key-encrypted data using the MFP secret key 210. The MFP secret key 210 is known only to the MFP 200, and it not made available to others, in contrast to the MFP public key 122. Decoding the public-key encoded data 130 by a decoder (or decrypter) 220 that uses the MFP secret key 210, provides decoded data 230.

An RIP processor 240 then performs RIP processing on the decoded data 230, to provide RIP-processed data 242. The RIP-processed data 242 is then encoded by an encoder (or encrypter) 245 that uses the User's public key 250. The encoder 245 outputs User-public-key-encoded print data 260, which is stored as an encrypted raster image file in a HDD of the MFP 200 or in a database accessible by the MFP 200. The User's public key 250 is found in a database of user public keys based on the user ID information included in the encrypted data. The User public key 250 can be obtained from one of a variety of sources, such as from the Internet, or from a database that previously stores public keys of users who are allowed to print jobs using the MFP 200.

Figure 3:
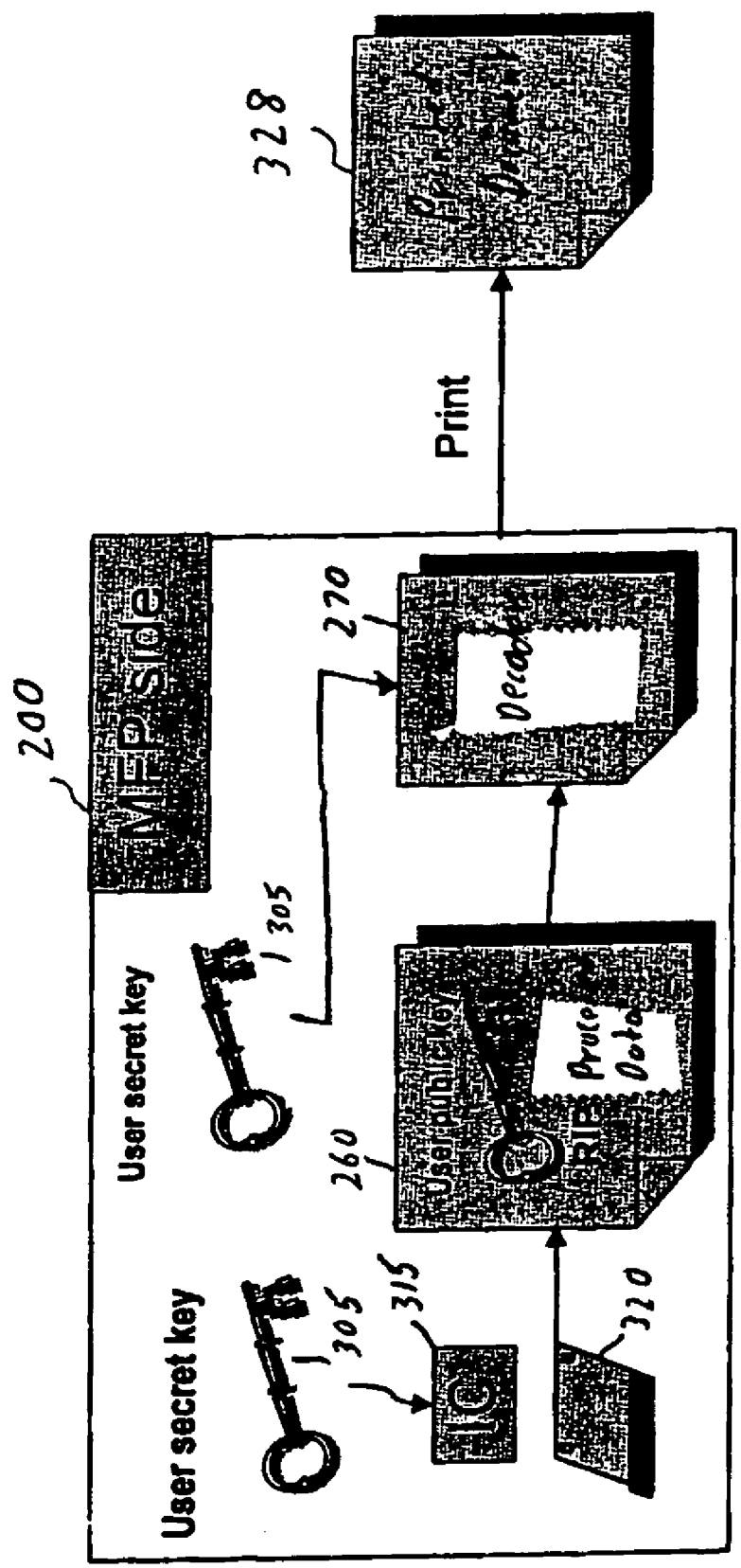
FIG. 3 is a block diagram of components provided in the MFP to receive user authentication data and eventually print the saved print file, in accordance with the first embodiment of the invention.

FIG. 3 is a block diagram showing components of the MFP 200 utilized to print an encrypted document, in accordance with the first embodiment of the invention. To print the encrypted raster image data 260 stored at the MFP 200 (or in a database accessible by the MFP 200), the user selects a "Print" option on the MFP 200, and inputs an authentication device (e.g., Integrated Circuit card or smart card) 315 to a user ID input port 320 of the MFP 200, whereby the authentication device 315 includes the User's Secret Key 305. The MFP 200 then obtains the encrypted raster image data 260 from storage, and decrypts the encrypted raster image data 260 by a decoder (or decrypter) 270 that uses the User's Secret Key 305 in the decryption process, and prints out the data as a securely-printed print job 328. The user then picks up the securely-printed print job 328 at the MFP 200. Since the data-to-be-printed has already been RIP processed at the MFP 200 prior to the user entering his/her authentication data at the MFP 200, the user does not have to wait a long time for the print job to be printed by the MFP 200, in contrast to conventional security print methods for MFPs.

In the first embodiment, the print data undergoes two separate encryptions: one at the User's PC 100 (using the MFP public key) and one at the MFP 200 (using the User's public key). Also, the print data undergoes two separate decryptions: one at the MFP 200 (using the MFP secret key) and another at the MFP 200 (using the User's secret key).

An alternative to the foregoing, though somewhat less secure, is to have the MFP perform the necessary decoding and performing raster image processing and store the decoded data in a hard drive or other medium. Then, instead of further coding the data using a user public key, the decoded data is stored, and made accessible through a user inputting a user name, code, or the like into the MFP, which then makes the job available for printing. This permits some level of control of printing of the document, though not as secure as the first embodiment above.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method of printing a document in a secure manner, comprising:
   receiving, by a printer, print data that has been encrypted using a printer public key;
   decrypting the printer-public-key-encrypted print data using only a printer secret key, to obtain decrypted print data;
   determining user identification information provided in the decrypted print data;
   performing print pre-processing on the decrypted print data, to thereby obtain pre-processed print data;
   encrypting the pre-processed print data using a user public key to obtain user-public-key-encrypted print data, and storing the user-public-key-encrypted print data;
   receiving a user secret key; and
   after receiving the user secret key, decrypting the user-public-key-encrypted print data and printing the print data.

2. The method according to claim 1, further comprising:
   inputting the user secret key directly to the printer; and
   decrypting the user-public-key-encrypted print data using the inputted user secret key.

3. The method according to claim 2, wherein the step of inputting is performed by inputting a smart card to the printer.

4. The method according to claim 1, wherein the print pre-processing comprises raster image processing that is performed on the decrypted print data prior to the printer receiving the user secret key.

5. The method according to claim 1, wherein the printer public key is obtained by a personal computer that performs the encryption of the print data, by the computer accessing an internal memory or from the Internet.

6. The method according to claim 1, further comprising:
   after the first decrypting step, determining user identification data that is provided in the decrypted print data.

7. The method according to claim 6, further comprising:
   obtaining the user public key from one of an internal memory of the printer or a network connection, based on the user identification data determined in the determining step,
   wherein the step of encrypting the pre-processed print data encrypts the pre-processed print data using the user public key obtained in the obtaining step.

8. A printer comprising:
   an input unit configured to receive print data that has been encrypted using a printer public key;
   a decrypting unit configured to decrypt the printer-public-key-encrypted print data using only a printer secret key, to obtain decrypted print data and to obtain user identification information provided with the print data;
   a print pre-processing unit configured to perform pre-processing on the decrypted print data received from the decrypting unit, to thereby obtain pre-processed print data; and
   an encrypting unit configured to encrypt the pre-processed print data received from the print pre-processing unit using a user public key to obtain user-public-key-encrypted print data, and to store the user-public-key-encrypted print data, wherein the user-public-key-encrypted print data is decrypted and printed by the printer upon receipt of a user secret key, prior to printing the print data.

9. The printer according to claim 8, wherein the printer further comprises:

an identification input unit configured to receive an input from the user corresponding to the user secret key; and wherein the user-public-key-encrypted print data is decrypted by the decrypting unit using the inputted user secret key.

10. The printer according to claim 9, wherein the identification input unit is configured to receive and obtain information provided on a smart card.

11. The printer according to claim 8, wherein the print pre-processing unit corresponds to raster image processing unit that performs raster image processing on the decrypted print data prior to the printer receiving the user secret key.

12. The printer according to claim 8, wherein the printer public key is obtained by a personal computer from an internal memory of the personal computer or from an Internet.

13. The printer according to claim 8, wherein the printer further comprises:

a determining unit configured to determine user identification data in the decrypted print data.

14. The printer according to claim 13, wherein the user public key is obtained by the printer from one of an internal memory of the printer or a network connection, based on the user identification data determined by the determining unit, and wherein the encrypting unit encrypts the pre-processed print data using the user public key obtained by the printer.

15. A method of printing a document in a secure manner, comprising:

receiving, by a printer, print data that has been encrypted using a printer public key;

decrypting the printer-public-key-encrypted print data using only a printer secret key, to obtain decrypted print data;

obtaining user identification information that has been provided in the print data;

performing print pre-processing on the decrypted print data, to thereby obtain pre-processed print data;

storing the pre-processed print data in a memory accessible by the printer;

receiving, by the printer, a user input corresponding to identification information;

comparing the user input to the user identification information that has been obtained in the obtaining step, wherein, if the comparing step indicates that the user identification obtained in the obtaining step is the same as the user input corresponding to identification information, the pre-processed print data is printed by the printer.

16. The method according to claim 15, wherein the user input is received by the printer by way of a smart card provided to an input device of the printer.

17. The method according to claim 15, wherein the print pre-processing corresponds to raster image processing that is performed on the decrypted print data prior to the printer receiving the user secret key.

18. The method according to claim 15, wherein the printer public key is obtained by a personal computer that encodes the print data prior to outputting the encrypted print data to the printer.

19. The method according to claim 15, wherein the user identification information includes at least one of a user name and a user password.

20. The method according to claim 15, wherein, if the comparing step indicates that the user identification obtained in the obtaining step is not the same as the user input corresponding to identification information, the pre-processed print data is not printed by the printer.

21. A method of printing a document in a secure manner, comprising:

receiving, by a printer, print data that has been encrypted using a printer public key;

decrypting the printer-public-key-encrypted print data using only a printer secret key, to obtain decrypted print data;

determining first user identification information provided in the decrypted print data;

performing print pre-processing on the decrypted print data, to thereby obtain pre-processed print data;

storing the pre-processed print data at the printer;

receiving, by the printer, second user identification information directly input to the printer;

comparing the first user identification information to the second user identification information to see if there is a match; and printing the pre-processed print data when there the comparing step indicates a match.

22. The method according to claim 21, wherein the step of receiving the second user identification information is performed by inputting a smart card to the printer.

23. The method according to claim 21, wherein the print pre-processing comprises raster image processing that is performed on the decrypted print data prior to the printer receiving the user secret key.

* * * * *